United States Patent [19]
Kawamura

[11] Patent Number: 5,091,739
[45] Date of Patent: Feb. 25, 1992

[54] REAL IMAGE MODE FINDER

[75] Inventor: Kazuteru Kawamura, Hino, Japan

[73] Assignee: Olympus Optical Co., Ltd., Tokyo, Japan

[21] Appl. No.: 570,852

[22] Filed: Aug. 22, 1990

[30] Foreign Application Priority Data

Aug. 25, 1989 [JP] Japan .................................. 1-219991

[51] Int. Cl.⁵ ............................................. G03B 19/12
[52] U.S. Cl. ..................................... 354/152; 354/219
[58] Field of Search ............... 354/152, 219, 220, 221, 354/222, 223, 224, 225, 153-158; 350/286, 287, 569, 622

[56] References Cited

U.S. PATENT DOCUMENTS

| | | | |
|---|---|---|---|
| 3,788,202 | 1/1974 | Wiessner | 354/152 |
| 4,021,823 | 5/1977 | Miyata | 354/225 X |
| 4,322,150 | 3/1982 | Kamata et al. | 354/195.12 |
| 4,912,500 | 3/1990 | Yokota et al. | 354/152 X |
| 4,978,199 | 12/1990 | Mukai et al. | 350/286 |

FOREIGN PATENT DOCUMENTS 2543160  4/1976  Fed. Rep. of Germany ...... 354/223
59-229536 12/1984 Japan .................................. 354/219

Primary Examiner—L. T. Hix
Assistant Examiner—Howard B. Blankenship
Attorney, Agent, or Firm—Cushman, Darby & Cushman

[57] ABSTRACT

A real image mode finder is provided with an objective lens, an image erection unit, and an eyepiece lens, and the image erection unit comprises a reflection member bending laterally an optical path and a prism constructed so that a light beam reflected at the reflection member enters a common surface, is reflected from a reflection surface toward the common surface, is further reflected from the common surface, and then emerges from an emergence surface. Whereby, the real image mode finder is adapted to eliminate longitudinal and lateral projections like a Porro prism, diminish the number of prisms and the number of times of reflections in comparison with a Pechan prism, and meet space-saving and low cost so as to be capable of accommodating a small-sized camera body.

11 Claims, 5 Drawing Sheets

REAL IMAGE MODE FINDER

BACKGROUND OF THE INVENTION a) Field of the Invention

This invention relates to a real image mode finder used to zoom lens shutter cameras.

b) Description of the Prior Art

In finders for zoom lens shutter cameras with high variable power, Albada type and bright frame type finders are unsuitable for compact designs because their outer diameters of lenses become inevitably large, so that the use of a real image mode finder is effective.

In general, a Porro prism is used as a means for erecting an image in the real image mode finder. The Porro prism, however, needs to provide, upward or downward, space at least twice the height of an imaging plane involved in a finder objective lens and laterally space at least twice the width of the imaging plane. Further, in consideration of the layout relative to the inside of a camera body, a prism section is necessarily arranged just before an eyepiece lens, namely, in the vicinity of a film box. Consequently, if it is intended that the height of the body is reduced, the width of the body will be increased for the purpose of preventing interference with the film box, while if the width of the body is to be narrowed, the height of the body will be increased. As such, where the compact design of the body is taken into consideration, image erection involved in the Porro prism has come to a principal cause restricting the compact design.

Accordingly, as a space-saving prism configuration for the image erection, a Pechan prism is available such as is set forth in Japanese Patent Preliminary Publication No. Sho 59-229536, for instance.

This example, as shown in FIG. 1, is adapted to combine a triangular prism X with a triangular Dach prism Y having a Dach surface and is constructed so that light coming from an objective lens not shown, after reflection at a lower surface 1 of the triangular prism X, is reflected from an upper surface 2, emanates from the lower surface 1 to be incident on the triangular Dach prism Y, is totally reflected from a reflection surface 4 before being reflected twice by a Dach surface 3, further reflected from an incidence surface 5 to emerge from the emergence surface 4, and directed toward an eyepiece lens not shown.

The construction in which the Pechan prism is employed is such that each of the lower surface 1 of the triangular prism X and the incidence surface 5 and emergence surface 4 of the triangular Dach prism Y has the functions of reflection and transmission of light. If, however, it is intended that the light is transmitted perpendicularly through and totally reflected from each of these surfaces, the prism configuration will be useful only in the case where reflected light is made incident at an angle of 45° on each surface. Consequently, in order to fulfil simultaneously the total reflection and transmission with respect to such each surface, it is necessary for the prisms to use materials with high refractive indices or to partially have reflection coatings. Moreover, in this type of configuration, two prism elements are required and the number of reflections is as large as six, so that the degree of angular accuracy of each surface must be increased. As such, the use of the Pechan prism as the image erection means leads to high cost and in particular, the use of the prism for products aimed at low cost, such as lens shutter cameras, has been very disadvantageous.

SUMMARY OF THE INVENTION

The object of the present invention, therefore, is to provide a real image mode finder capable of accommodating a compact camera body in which such longitudinal and lateral projections as in the Porro prism are eliminated, the number of prisms and the number of times of reflections are diminished in comparison with the Pechan prism, and space-saving and low cost are achieved.

This object is accomplished, according to the present invention, by the arrangement that in the real image mode finder is provided with an objective lens, an image erection means, and an eyepiece lens disposed behind an image of an object formed through the objective lens. The image erection means comprises a reflection member disposed behind the objective lens to bend laterally an optical path and a prism having a common surface capable of serving as a transmission surface or a reflection surface in response to the direction of incidence of a beam of light, another reflection surface and an emergence surface so that the light beam reflected from the reflection member enters the common surface to be reflected back from the another reflection surface toward the common surface, is further reflected from the common surface, and then emerges from the emergence surface, in which the reflection member or the another reflection surface of the prism is configured as a roof-shaped reflection surface.

Further, according to the present invention, the real image mode finder is constructed so that the image erection means comprises a prism having an incidence surface, a common surface capable of serving as a reflection surface or a transmission surface in response to the direction of incidence of a beam of light and another reflection surface so that the light beam coming from the objective lens enters the incidence surface to be reflected from the common surface toward another reflection surface, is further reflected from the other reflection surface, and then emerges from the common surface and a reflection member reflecting an emergent beam of light from the prism toward the eyepiece lens, in which the another reflection surface of the prism or the reflection member is configured as a roof-shaped reflection surface.

This and other objects as well as the features and the advantages of the present invention will become apparent from the following detailed description of the preferred embodiments when taken in conjunction with the accompanying drawings.

DESCRIPTION OF THE PREFERRED EMBODIMENTS

Prior to the explanation of the embodiments of the present invention, referring now to FIGS. 2 and 3, fundamental arrangements of the present invention will be described in detail below.

Figure 1:
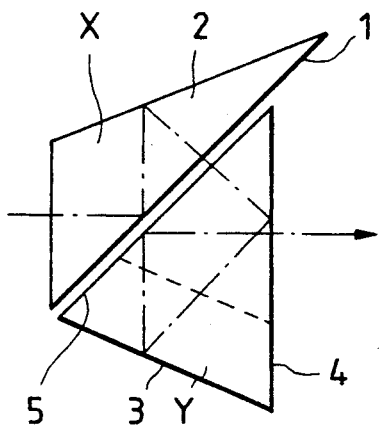
FIG. 1 is a view showing a typical optical system of a conventional real image mode finder.
Figure 2:
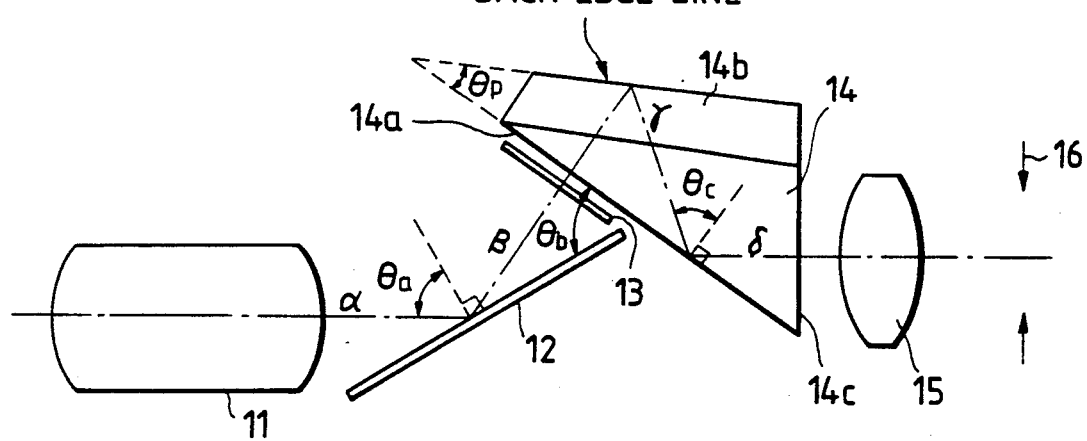
FIGS. 2 and 3 are plan views showing conceptions of a real image mode finder according to the present invention.

FIG. 2 is a plan view showing a conception of the real image mode finder according to the present invention, in which reference numeral 11 represents a finder objective lens, 12 a mirror arranged in the rear thereof, 13 a focusing plate arranged at a focal plane of the objective lens 11, on the opposite side of the mirror 12, 14 a prism located behind the mirror 12 and the focusing plate 13, the prism 14 having a surface 14a capable of serving as a transmission surface or a reflection surface in response to the direction of incidence of a beam of light (which will be hereinafter abbreviated to surface 14a), a Dach surface 14b and an emergence surface 14c, 15 eyepiece lens arranged in the rear of the emergence surface 14c and behind an image of an object formed by the objective lens 11, and 16 a pupil. The mirror 12 and the prism 14 constitute an image erection means.

Further, a ray of light $\alpha$ which has traversed the finder objective lens 11 is incident at an incident angle $\theta a$ on the mirror 12 and bent obliquely rearward to turn to a ray of light $\beta$. The light ray $\beta$, after being brought to a focus at the focusing plate 13, is incident perpendicularly through the surface 14a on the prism 14. In this case, an angle $\theta b$ made by the mirror 12 with the surface 14a is given by $$\theta b = \theta a \quad (1)$$

The light ray $\beta$ is then bent by twice-reflection from the Dach surface 14b to further turn to a ray of light $\gamma$, which is bent by internal reflection (total reflection) from the surface 14a to finally turn to a ray of light $\delta$. The light ray $\delta$ emerges from the prism 14 through the emergence surface 14c, passes through the eyepiece lens 15, and reaches the pupil 16. Here, if an angle $\theta p$ made by the surface 14a of the prism 14 with a Dach edge line thereof is given by $$\theta p = 90° - \theta a \quad (2)$$

an incident angle $\theta c$ at which the light ray $\gamma$ enters the surface 14a is, from Equation (2), $$\theta c = 2\theta p = 180° - 2\theta a \quad (3)$$

and it is seen that in this finder, the incident ray $\alpha$ and the emergent ray $\delta$ become parallel to each other.

Thus, the arrangement discussed above makes it possible to erect an image with only few components of a single mirror and a single prism and will not occupy much space in lateral and longitudinal directions.

Also, Equation (1) may not necessarily be materialized, that is, the ray may not necessarily be incident perpendicularly on the surface 14a of the prism 14.

When, for example, $\theta b > \theta a$, the overall length of the prism 14 diminishes, with the result that the total length of the finder can be decreased. However, as $|\theta b - \theta a| > 0$ becomes large, chromatic aberration and astigmatism increase with the resultant difficulty of a view and therefore the condition of $|\theta b - \theta a| < 10°$ is desirable.

Further, from Equation (3), if $\theta a > 67.5°$, $\theta c < 45°$. This makes it difficult to fulfil the requirement of total reflection at the surface 14a. Moreover, if $\theta a = 45°$, $\theta c = 90°$, namely, the ray $\gamma$ becomes parallel to the ray $\alpha$ and consequently the above arrangement is made impossible. If $\theta a = 55°$, the overall length of the prism 14 required for the configuration of the prism 14 will be nearly 3.5-4 times larger than the width of the incident rays on the prism 14, so that what the angle $\theta a$ is made small is the obstacle to the reduction of the overall length of the prism 14. Also, if it is required that the angle $\theta a$ is made smaller, an optical path length extending to the eyepiece lens 15 will be increased and as a result, magnification will be inevitably reduced. Hence, the condition of $55° \leq \theta a \leq 67.5°$ is desirable.

Now, although it has been stated that in the case of $\theta c < 45°$, it is difficult to satisfy the requirement of total reflection at the surface 14a, this condition varies according to the focal length of a loupe and the size of a pupil diameter and therefore can be moderated to such an extent that there is no problem in practical use.

Further, the condition is adapted to use acrylic resin with a low refractive index and can likewise be moderated when a glass material with a high refractive index is employed.

In view of the foregoing, it is desirable in practical use that the condition of the incident angle $\theta a$ is defined as $$55° \leq \theta a \leq 70°$$

Figure 3:
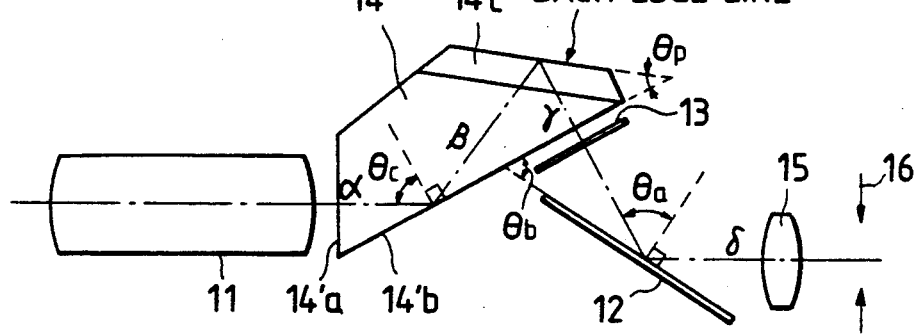

FIG. 3 is a plan view showing another conception of the real image mode finder according to the present invention, in which a positional relationship between the mirror 12 and a prism 14' constituting the image erection means is the reverse of that of FIG. 2 and the prism 14' has an incidence surface 14'a, a surface 14'b capable of serving as a reflection surface or a transmission surface in response to the direction of incidence of the light beam (which will be hereinafter abbreviated to surface 14'b), and a Dach surface 14'c. Further, the focusing plate 13 is disposed on the incidence side of the mirror 12, at the focal plane of the objective lens.

The ray $\alpha$ which has traversed the finder objective lens 11 enters the prism 14' through the incidence surface 14'a and changes to the ray $\beta$ by the internal reflection (total reflection) at the surface 14'b. The ray $\beta$ is then bent by twice-reflection at the Dach surface 14'c to turn to the ray $\gamma$, which emerges normal to the surface 14'b therefrom. In this case, the relationship between the angle $\theta p$ made by the surface 14'b with the Dach edge line and the incident angle $\theta c$ of the ray $\alpha$ on the surface 14'b is expressed by $$\theta c = 2\theta p \quad (4)$$

Subsequently, the ray $\gamma$, after being brought to a focus at the focusing plate 13, is incident on the mirror 12 and bent rearward to change to the ray $\delta$, which travels through the eyepiece lens 15 and reaches the pupil 16. Here, the relationship between the angle $\theta b$ made by the surface 14'b with the mirror 12 and the incident angle θa of the ray γ on the mirror 12 is $$\theta b = \theta a \quad (5)$$

Further, if $$\theta p = 90° - \theta a \quad (6)$$

the incident angle θc becomes, from Equation (4) and (6), $$\theta c = 180° - 2\theta a \quad (7)$$

and it is seen that the incident ray α and the emergent ray γ in this finder are in parallel with each other.

Thus, the arrangement discussed above, like that shown in FIG. 2, makes it possible to erect the image without occupying much space in lateral and longitudinal directions.

Also, Equation (5) may not necessarily be fulfilled, that is, the ray may not necessarily be made to emerge perpendicularly from the surface 14'b of the prism 14'. It is desirable, however, that in order to prevent generation of chromatic aberration and astigmatism, as in FIG. 2, the ray is made to travel so as not to deviate largely from the path of the normal emergence.

Further, if θc≦45°, it becomes difficult to fulfil the condition of total reflection at the surface 14'b. Moreover, if θc>70°, the overall length of the prism 14' required for the configuration of the prism 14' will be nearly 3.5-4 times larger than the width of the emergent rays from the prism 14', so that what the angle θc is made larger is the obstacle to the reduction of the overall length of the prism 14'. Hence, the condition of 45°≦θc<70° is desirable. This is the same as the condition of 55°<θa≦67.5° 'relevant to FIG. 2.

Also, with respect to the incident angle θc, like the description of FIG. 2, the condition can be moderated in practical use and is desirably defined as $$40° \leq \theta c \leq 70°$$

Based on individual embodiments shown in the drawings, in which like reference numerals and symbols are used to designate like members with those shown in FIGS. 2 and 3, the present invention will be described in detail below.

Figure 4:
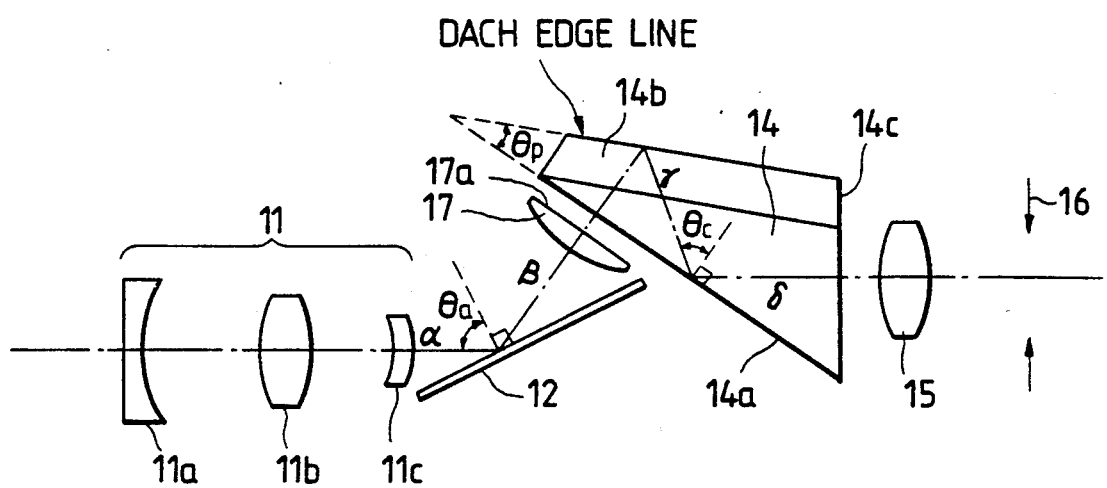
FIGS. 4 and 5 are plan views showing optical systems of first and second embodiments, respectively.

FIG. 4 is a plan view showing the optical system of a first embodiment, in which, in comparison with FIG. 2, the objective lens 11 is replaced by a zoom objective lens comprising a fixed lens 11a, and a variator 11b and a comparator 11c moved toward the fixed lens 11a on the side of a long focal length, and a field lens 17, instead of the focusing plate 13, is arranged so that its rear surface 17a coincides with the focal plane of the objective lens 11. In the case of this embodiment, the incident angle θa of the ray on the mirror 12 is 63° and the angle θp made by the surface 14a of the prism 14 with the Dach edge line is 27°.

The embodiment is constructed as stated in the foregoing and the ray α which has passed through the objective lens 11 is incident at an incident angle of 63° on the mirror 12 and bent obliquely rearward to turn into the ray β. Further, the ray β is brought to a focus at the rear surface 17a of the field lens 17 before entering the prism 14 through the surface 14a. Next, the ray β is bent by twice-reflection at the Dach surface 14b to change into the ray γ, which is totally reflected from the surface 14a to turn into the ray δ parallel with the ray α, emerges from the prism 14 through the emergence surface 14c, and traverses the eyepiece lens 15, reaching the pupil 16.

By the preceding construction, the prism projects only in a longitudinal direction of the plane of the figure to erect the image, and the projections at which the ray is curved obliquely rearward can be made small. In addition, because the incidence surface of the prism is used in common with the reflection surface, a single prism is enough and the number of times of reflections is reduced to four times, with the result that the image erection can be attained with an excessively small space. The prism, which is single, can be made at low cost.

Figure 5:
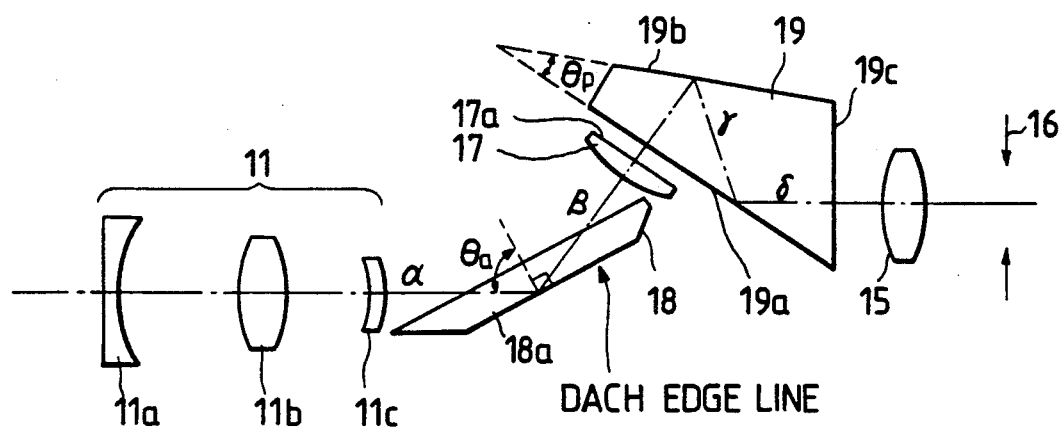

FIG. 5 is a plan view showing the optical system of a second embodiment, which is constructed in such a way as to use a Dach mirror 18 having a Dach surface 18a in place of the mirror 12 in the first embodiment and a prism 19, devoid of the Dach surface in place of the prism 14, having a surface 19a capable of serving as a transmission surface or a reflection surface in response to the direction of incidence of the light beam, a reflection surface 19b to which reflection coating is applied, and an emergence surface 19c.

The ray tracing in this embodiment is the same as in the first embodiment, except that the position where Dach reflection occurs is different, and its explanation is therefore omitted.

By the above construction, the second embodiment brings about the effects of space-saving and low cost like the first embodiment and has also the advantage that the configuration of the prism is facilitated by providing the Dach surface outside the prism.

Also, it is needless to say that the first and second embodiments may well be designed so that the optical path is not bent in the plane of the figure, but in the direction perpendicular to the plane of the figure.

Figure 6:
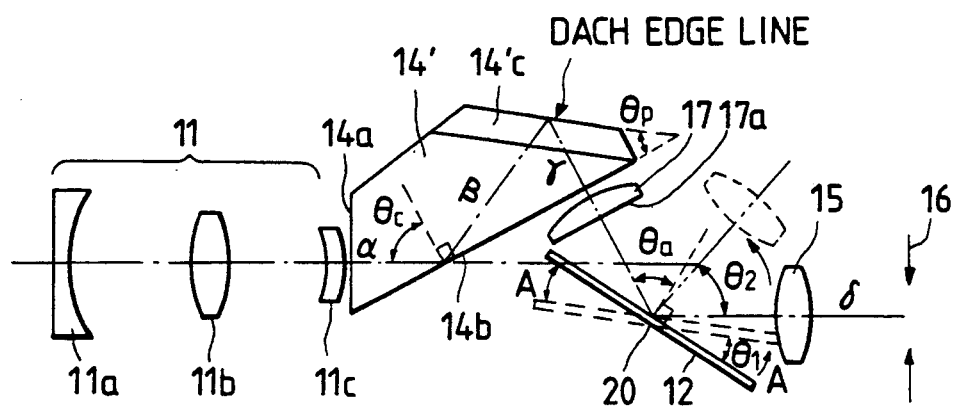
FIG. 6 is a side view showing an optical system of a third embodiment.

FIG. 6 is a side view showing the optical system of a third embodiment, which, in comparison with FIG. 3, comprises the zoom objective lens replacing the objective lens 11 like the first embodiment, the field lens 17 arranged, instead of the focusing plate 13, so that its rear surface 17a coincides with the focal plane of the objective lens 11, the mirror 12 rotatable about an intersection 20 of the mirror 12 with the optical axis in the direction of an arrow A, and the eyepiece lens 15 also rotatable about the intersection 20 in the direction of the arrow A. Further, a rotating angle θ2 of the eyepiece lens 15 to a rotating angle θ1 of the mirror 12 is to be set so that θ2=2θ1.

Figure 7A:
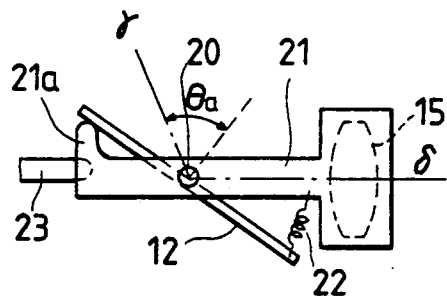
FIGS. 7A and 7B are views showing an ordinary state and a counterclockwise rotated state, respectively, of a mirror and an eyepiece lens in their rotation mechanism in the third embodiment.
Figure 7B:
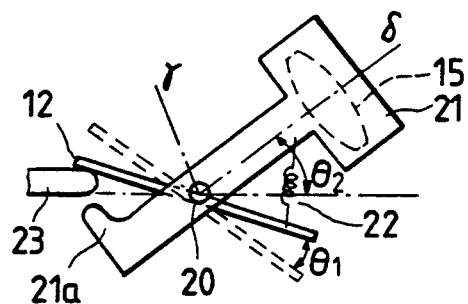

FIGS. 7A and 7B show an ordinary state and a counterclockwise rotated state, respectively, of the mirror and the eyepiece lens 15 in their rotation mechanisms. Reference numeral 21 represents an eyepiece frame attached rotatably, with a center at the intersection 20, to a camera body not shown and fixed moderately by, for example, a click means, in the states of FIGS. 7A and 7B, in which a stopper pin 21a for stopping counterclockwise rotation of the mirror 12 is configured at its top (the left hand of FIG. 7) and a spring 22 for biasing the counterclockwise behavior against the mirror 12 is tensioned between the frame 21 and the rear of the mirror 12 (the right hand of FIG. 7). Further, the mirror 12 is rotatably attached, with a center at the intersection 20, to the frame 21. Moreover, the camera body, not shown, is provided with another stopper pin 23 for stopping the counterclockwise rotation of the mirror 12 in the vicinity of the left edge of the mirror 12. In the state of FIG. 7, namely, in a first state, the arrangement is made such that the eyepiece frame 21 is moderately fixed at the position where the ray δ is in parallel with the ray α and such that the left edge of the mirror 12 is locked by the stopper pin 21a, thereby enabling the mirror 12 to be held in the state of $\theta a = 90° - \theta p$. Further, in the state of FIG. 7B, that is, in a second state, the arrangement is such that the eyepiece frame 21 is moderately fixed at the position where it is rotated counterclockwise by the angle $\theta_2$ and such that the left edge of the mirror 12 is locked by the another stopper pin 23 at the position where the mirror 12 is rotated counterclockwise by the angle $\theta_1$.

Third embodiment is constructed as in the foregoing and the ray α passing through the finder objective lens 11 is incident on the prism 14' through the incidence surface 14'a an is totally reflected from the surface 14'b into the ray β. Then, the ray β is bent by twice-reflection at the Dach surface 14'c into the ray γ, which emerges perpendicularly from the surface 14'b. Next, the ray γ, after being brought to a focus at the rear surface 17a of the field lens 17, enters the mirror 12 and is bent rearward into the ray δ, which traverses the eyepiece lens 15 to reach the pupil 16.

Here, when the eyepiece frame 21 is placed in the first state (the state of FIG. 7A), the image can be viewed from a horizontal direction, while in the second state (the state of FIG. 7B), it can be observed from an obliquely upward direction.

By the above construction, the third embodiment secures the effects of space-saving and low cost as in the first and second embodiments and has the advantage that, because the image is viewed from both the horizontal and obliquely upward directions, the object being photographed can be sighted with great ease, for instance, by the view from the obliquely upward direction in photographing the object located at a low position. In addition to the fact that it is possible to observe the image in two states of the horizontal and obliquely upward directions, the third embodiment also makes it possible that if the angles are continuously changed while the condition of $\theta_2 = 2\theta_1$ is satisfied by using cams, the image is viewed at any angle.

Figure 8:
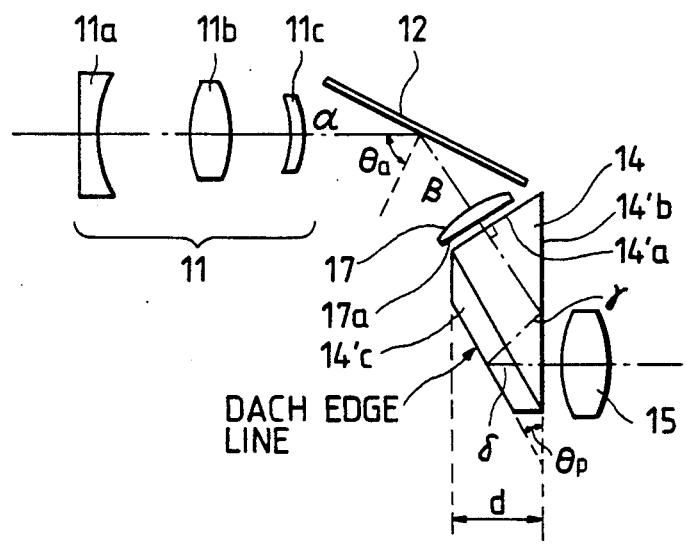
FIG. 8 is a view showing an optical system of a fourth embodiment.

FIG. 8 is a plan view showing the optical system of a fourth embodiment, which is designed so that, in comparison with the first embodiment shown in FIG. 4, the orientation of the prism 14 is reversed and the ray is incident through the surface which is the emergence surface in the first embodiment. That is, the ray tracing is such that the ray enters the incidence surface 14'a followed by the reflection at the surface 14'b, is further reflected from the Dach surface 14'c, and emerges from the surface 14'b. The relationships between the angles such as θa and θp are the same as in the first embodiment.

Figure 9A:
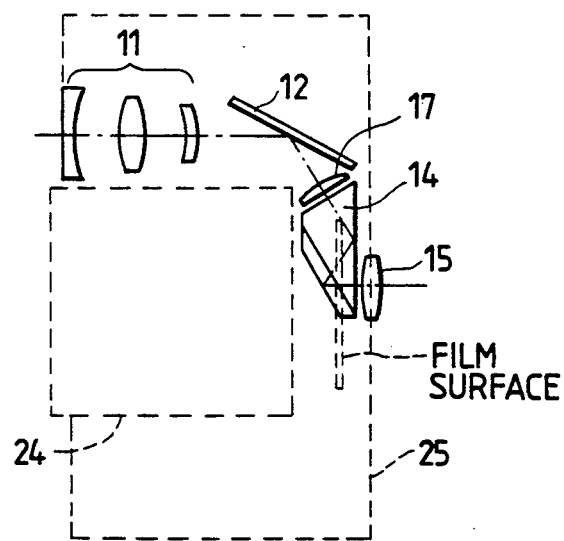
FIGS. 9A and 9B are plan and side views, respectively, showing a state where the optical system of the fourth embodiment is incorporated in a camera body.
Figure 9B:
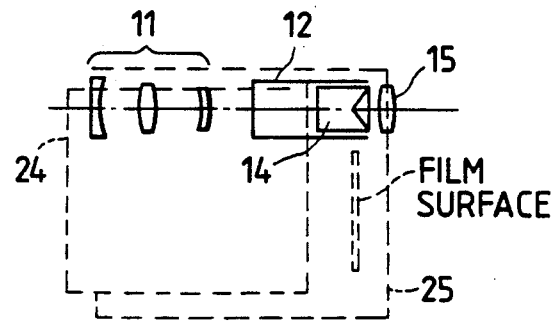

By this construction, the overall length of the prism in the embodiment can be extremely reduced as compared with that of the Pechan prism. Specifically, the embodiment has the advantage that although the optical system projects in a longitudinal direction of the plane of the figure, the length of the optical system (in a direction of the plane of the figure) will diminish accordingly. Further, in view of the layout relative to the inside of a camera body, such a construction has advantages that since a prism thickness d (FIG. 8) along the optical axis is very small, the prism 14, as depicted in FIG. 9A (the plan view) and FIG. 9B (the side view), can be accommodated in a dead space between a frame 24 for attaching a photographic lens and a rearmost face 25 of the body, with the result that the overall length is reduced and the layout is not subject to the restriction of the width of the body. In addition, as shown in FIG. 9A, the arrangement of the eyepiece lens 15 provided near the center of the body enables the finder to be very easy in use. It is needless to say that this embodiment, like the other embodiments, can be materialized at low cost.

Figure 10A:
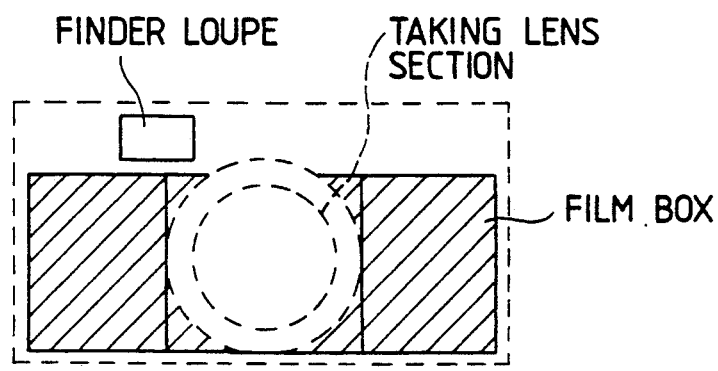
FIGS. 10A and 10B are explanatory views in the case where the real image mode finder of the present invention is incorporated in a common camera.
Figure 10B:
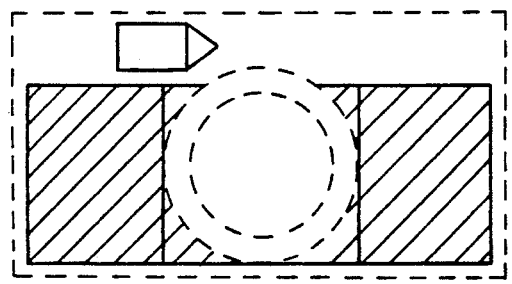

In a common camera in which a film is laterally wound, the height of the camera body necessary for the function of the camera is attained by adding the height of the finder loupe to that of a film box. The lateral width of the camera body is functionally determined by the size of the film box, unless a special film-winding way is needed (FIG. 10A). In FIGS. 2 and 3, when the traveling direction of the bent ray is taken as a lateral direction (in a horizontal plane) so that the optical system is disposed on the film box, it is possible to arrange the finder within the minimum space needed for the function of the camera. Also, if the Dach surface of the prism is disposed toward a taking lens section, it can be placed along an inclined face of the frame of the taking lens section and thus the layout in which the space is further effectively utilized is available (FIG. 10B).

What is claimed is:

1. A real image mode finder having an objective lens, image erection means, and an eyepiece lens arranged behind an image of an object formed by the objective lens, wherein said image erection means comprises:

a prism having an incidence surface, a common surface capable of serving as one of a reflection surface and a transmission surface in response to a direction of incidence of a beam of light, and another reflection surface, the light beam coming from said objective lens being incident on said incidence surface, reflected from said common surface toward said another reflection surface and further reflected from said another reflection surface, and then emerging from said common surface; and a reflection member reflecting the light beam emerging from said prism toward said eyepiece lens, one of said another reflection surface of said prism and said reflection member is configured as a roof-shaped reflection surface so that the image is erected by reflections, the number of times of which amounts to four, and when an optical axis of said objective lens is substantially parallel to that of said eyepiece lens, the following condition is satisfied:

$$40° < \theta c < 70°$$

where θc is the angle made by a normal of the common surface with the optical axis of the objective lens.

2. A real image mode finder having an objective lens, image erection means, and an eyepiece lens arranged behind an image of an object formed by the objective lens, wherein said image erection means comprises:

a reflection member arranged behind said objective lens for bending obliquely rearward an optical path; and a prism having an incidence surface, a common surface capable of serving as one of a reflection surface and a transmission surface in response to a direction of incidence of a beam of light, and another reflection surface, the light beam reflected from said reflection member being incident on said incidence surface, reflected from said common surface toward said another reflection surface and further reflected by said another reflection surface, and then emerging from said common surface, one of said reflection member and said another reflection surface of said prism is configured as a roof-shaped reflection surface so that the image is erected by reflections, the number of times of which amounts to four, and the entire arrangement of a finder optical path from said objective lens to said eyepiece lens is made in a substantial L shape.

3. The finder according to one of claims 1 or 2, wherein said objective lens is a zoom lens system including, in order from the object side, a fixed lens, and a variator lens and a comparator lens which move along an optical axis for changing a focal length of said objective lens.

4. The finder according to claim 1, wherein said reflection member and said eyepiece lens are arranged to be rotatable around an axis including an intersection of said reflection member with an optical axis of said eyepiece lens.

5. The finder according to one of claims 1 or 2, satisfying the following condition:

$$55° \leq \theta a \leq 70°$$

where $\theta a$ is the angle made by a normal of a reflection surface of the reflection member with an optical axis of the objective lens.

6. The camera according to one of claims 1 or 2, wherein said prism is disposed behind a lens barrel of a photographic lens.

7. A camera equipped with a real image mode finder optical system having an objective lens, image erection means, and an eyepiece lens arranged behind an image of an object formed by the objective lens and a photographic lens system arranged parallel with the finder optical system, wherein said image erection means consists of:

a prism having an incidence surface, a common surface capable of serving as one of a reflection surface and a transmission surface in response to a direction of incidence of a beam of light, and a second reflection surface, the light beam coming from said objective lens and being incident on said incidence surface, then reflected from said common surface toward said second reflection surface and further reflected from said second reflection surface and then emerging from said common surface; and a reflection member reflecting the light beam emerging from said prism toward said eyepiece lens, one of said second reflection surface of said prism and said reflection member is configured as a roof-shaped reflection surface so that the image is erected by reflections, the number of times of which amounts to four, and when an optical axis of said objective lens is substantially parallel to that of said eyepiece lens, the following condition is satisfied:

$$40° \leq \theta c \leq 70°$$

where $\theta c$ is the angle made by a normal of the common surface with the optical axis of the objective lens.

8. A camera equipped with a real image mode finder optical system having an objective lens, image erection means, and an eyepiece lens arranged behind an image of an object formed by the objective lens and a photographic lens system arranged parallel with the finder optical system, wherein said image erection means consists of:

a reflection member arranged behind said objective lens for bending obliquely rearward an optical path; and a prism having an incidence surface, a common surface capable of serving as one of a reflection surface and a transmission surface in response to a direction of incidence of a beam of light, and a second reflection surface, the light beam reflected from said reflection member being incident on said incidence surface, and then reflected from said common surface toward said second reflection surface, and further reflected by said second reflection surface, and then emerging from said common surface, one of said reflection member and said another reflection surface of said prism is configured as a roof-shaped reflection surface so that the image is erected by reflections, the number of times of which amounts to four, and the entire arrangement of a finder optical path from said objective lens to said eyepiece lens is made in a substantial L shape.

9. A finder according to claim 2, wherein said finder is disposed in a substantially horizontal plane.

10. A real image mode finder for a zoom lens camera, comprising:

an objective lens unit;

an image erection means including:

a prism having a first surface through which an incident beam enters, said first surface being normal to the incident beam, a second surface for reflecting said incident beam, and a third surface for reflecting said beam reflected by said second surface, the beam reflected by said third surface exiting said prism through said second surface, the exiting beam being normal to the second surface; and a reflecting member for reflecting said exiting beam in a direction such that said reflected exiting beam is parallel to the incident beam, said reflecting member reflecting said exiting beam at an angle greater than 90°; and an eyepiece lens unit arranged normal to the reflected exiting beam.

11. A real image mode finder having an objective lens, image erection means, and an eyepiece lens arranged behind an image of an object formed by the objective lens, wherein said image erection means consists of:

a prism having an incidence surface, a common surface capable of serving as one of a reflection surface and a transmission surface in response to a direction of incidence of a beam of light, and another reflection surface, the light beam coming from said objective lens being incident on said incidence surface, reflected from said common surface toward said another reflection surface and further reflected from said another reflection surface, and then emerging from said common surface; and a reflection member reflecting the light beam emerging from said prism toward said eyepiece lens, one of said another reflection surface of said prism and said reflection member is configured as a roof-shaped reflection surface.

* * * * *